United States Patent [19]

Simms

[11] Patent Number: 4,831,632
[45] Date of Patent: May 16, 1989

[54] METHOD AND APPARATUS FOR OPTICALLY ALIGNING A LASER CAVITY

[75] Inventor: Graham J. Simms, Bracknell, England

[73] Assignee: British Aerospace Public Limited Company, London, England

[21] Appl. No.: 66,370

[22] Filed: Jun. 25, 1987

[30] Foreign Application Priority Data

Jun. 27, 1986 [GB] United Kingdom ............... 8615789

[51] Int. Cl.⁴ .............................................. H01S 3/086
[52] U.S. Cl. ...................................... 372/107; 356/350
[58] Field of Search ...................... 372/107; 356/350; 350/607, 632

[56] References Cited

U.S. PATENT DOCUMENTS

| 3,906,394 | 9/1975 | Tanaka | 331/94.5 C |
| 4,628,515 | 12/1986 | Rodloff et al. | 372/107 |
| 4,691,323 | 9/1987 | Ljung et al. | 372/107 |

FOREIGN PATENT DOCUMENTS

| 0108562 | 5/1984 | European Pat. Off. | |
| 85/03568 | 8/1985 | PCT Int'l Appl. | 356/350 |
| 1112477 | 5/1968 | United Kingdom. | |
| 2007906 | 5/1979 | United Kingdom. | |
| 2059143 | 4/1981 | United Kingdom | 372/107 |
| 2149566 | 6/1985 | United Kingdom. | |

Primary Examiner—James W. Davie
Attorney, Agent, or Firm—Cushman, Darby & Cushman

[57] ABSTRACT

A method and apparatus for aligning the mirrors of a laser cavity while the cavity is lasing. The orientation of the reflecting surface of the mirror in a laser cavity is modified by deforming the rear surface of the mirror in order to achieve a desired orientation of the reflecting surface and maintaining the reflecting surface in the desired orientation. In accordance with the preferred embodiment of the invention, the mirror is maintained in a desired orientation with a cavity alignment spring. More particularly, a spring is attached to a projection on the rear surface of the mirror and is adapted to apply a predetermined deflection to the projection. Thus, the spring engages and applies a mechanical force to a flexible member on which the reflecting surface is provided from outside the cavity in order to distort and maintain distorted the reflecting surface to a position which enables the proper laser operation.

7 Claims, 1 Drawing Sheet 4,831,632

METHOD AND APPARATUS FOR OPTICALLY ALIGNING A LASER CAVITY

BACKGROUND OF THE INVENTION

1. Field of the Invention

This invention relates to lasers and is particularly concerned with alignment of lasing cavities, in a ring laser gyroscope for example.

2. Description of the Related Art

Achieving optical alignment of lasing cavities has always been difficult as one mirror, usually a curved mirror, may have to be removed and re-aligned at least once during the building of a lasing cavity or laser. Removal of the mirror and its subsequent re-alignment may result in having to fill the cavity repeatedly with the gain medium and to check the mirror alignment until the correct alignment is achieved. This repetitive procedure increases the risk of scratching sealing faces and the mirror surface as well as introducing contaminants into the clean lasing cavity. Naturally, the problem is worse when triaxial ring laser gyroscopes are being built as each mirror is shared between at least two axes and lasing has to be achieved in three axes simultaneously.

SUMMARY OF THE INVENTION

It is known from U.K. Patent Application Nos. 2007906A and 2149566A to adjust the angular orientation of a mirror in a laser cavity by a screw-adjustment mechanism abutting the reflecting surface of the mirror. Whilst these mechanisms are constructed so as to be accessible from outside the laser cavity they are totally unsuitable for use in certain applications such as a ring laser gyroscope where a rugged construction is essential and where dithering of the cavity is carried out during operation.

According to one aspect of the present invention we provide a method of modifying the orientation of the reflecting surface of a mirror in a laser cavity comprising deforming the rear surface of the mirror so as to achieve a desired orientation of the reflecting surface and attaching means to the mirror to maintain the reflecting surface in the desired orientation.

The method of the invention enables the mirrors of a laser cavity to be aligned whilst the cavity is lasing thus greatly facilitating the alignment procedure. Furthermore, the invention involves attaching means, such as a cavity alignment spring, to the mirror to maintain the desired orientation thereby permitting subsequent dithering of the cavity, if appropriate.

Preferably, the method comprises attaching spring means to a projection on the rear surface of the mirror, the spring means being adapted to apply a predetermined deflection to said projection. The spring means may comprise a semi-circular part configured to abut the projection and which lies within a generally circular part.

According to a second aspect of the invention, there is provided a method of making an optical cavity assembly for laser apparatus which assembly includes, for defining an extremity of the optical cavity a reflecting surface provided on a flexible member, the method including building the assembly with said flexible member installed in its position of use, then installing in said assembly a force applying member which engages and applies a mechanical force to said flexible member from outside the cavity to distort, and maintain distorted, said reflecting surface to a position enabling the achievement of proper laser operation.

In accordance with another aspect of the present invention, we provide an optical cavity assembly for laser apparatus comprising at least two mirrors and spring means attached behind at least one of the mirrors so as to modify the orientation of the reflective surface of said mirror.

In accordance with another aspect of the present invention we provide spring means for distorting the shape of a flexible mirror forming part of a laser cavity as herein described.

According to yet a further aspect, there is provided an optical cavity assembly for laser apparatus, the assembly including a reflecting surface provided on a flexible member and defining an extremity of the cavity, and a force applying member mounted in engagement with the flexible member for applying a mechanical force to the flexible member from outside of the optical cavity, said force applying member serving or having served to distort said reflecting surface to achieve lasing within said cavity.

According to yet a further aspect, there is provided an optical cavity assembly for laser apparatus, the assembly including a reflecting surface provided on one face of a substrate, in the opposite face of which there is an annular recess extending around a central columnar portion of the substrate and being extended around by a peripheral wall portion of the substrate, the base of said recess being spaced from said one face by a relatively small thickness of the substrate material to permit axial movement of said columnar portion relative to said wall portion and consequent movement of said reflecting surface, the assembly further including spring means mounted in said recess and operable to apply a force to one side of the columnar portion.

BRIEF DESCRIPTION OF THE DRAWINGS

For a better understanding of the invention, reference will now be made, by way of example, to the accompanying drawings in which.

DETAILED DESCRIPTION OF THE PRESENTLY PREFERRED EXEMPLARY EMBODIMENT

Figure 1:
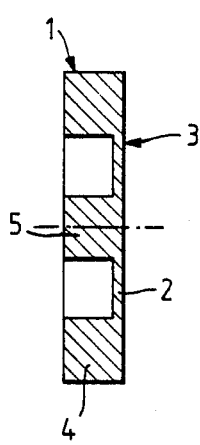
FIG. 1 is a sectioned side elevation of a path length control mirror.

FIG. 1 illustrates a path length control mirror 1 for a lasing cavity which is used to adjust the path length of the cavity so that the desired lasing mode is obtained. The mirror 1 comprises a thin, circular, flexible diaphragm 2 on which a planar mirror surface 3 is formed. the diaphragm 2 is supported by a ring portion 4 and a central projecting portion 5, the portions 4 and 5 being formed integrally with the diaphragm 2.

Figure 2:
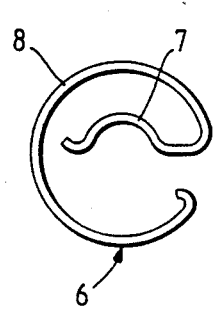
FIG. 2 is a plan elevation of a cavity alignment spring for use with the FIG. 1 mirror.

In practice, a lasing cavity including the mirror 1 is set up so that there is access to the rear of the mirror 1. If the cavity does not lase as desired a force is applied to the projection 5 of the mirror 1 with the aid of a load deflection meter so as to alter the angular orientation of the mirror surface 3. When an adequate lasing performance is achieved a spring of the type shown in FIG. 2 is fashioned to apply the desired loading to the projection 5 of the mirror 1.

It was found that by applying a load to the central portion 5 of the path length control mirror 1, while it forms part of a discharging lasing cavity, the alignment of the laser beam within the cavity can be improved. A cavity alignment spring 6 as shown in FIG. 2 was designed to apply the appropriate loading to the portions so that the improved alignment of the laser beam within the cavity is obtained.

Figure 3:
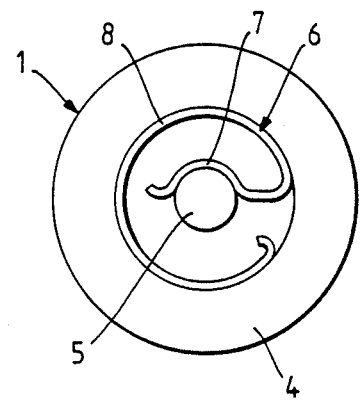
FIG. 3 is a plane elevation of the FIG. 2 spring assembled in a path length control mirror.

The spring 6 is a piece of wire shaped to have a semi-circular portion 7 lying within a generally circular portion 8. The spring 6 is designed to apply a force to the portion 5 to modify very slightly the angular orientation of the mirror surface 3 to optimise lasing performance. In FIG. 3, the spring 6 is assembled on the mirror 1, the semicircular portion 7 pressing against the portion 5 with the rest of the spring lying in contact with the ring portion 4 as shown in FIG. 3.

Figure 4:
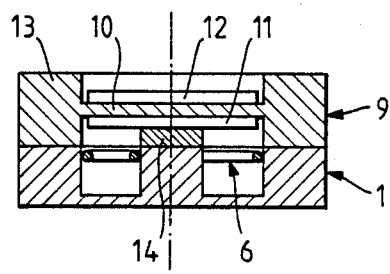
FIG. 4 is a sectional side elevation of the FIG. 3 arrangement with the mirror adjustment transducer shown.

FIG. 4 shows the cavity alignment spring 6 sealed within the path length control mirror 1 by a piezoelectric transducer assembly 9. The assembly 9 comprises a circular flexible diaphragm 10 on which are mounted two piezoelectric elements 11, 12, one each side of the diaphragm 10. The diaphragm 10 is supported by a ring member 13 which is sealed to the ring portion 4 of the mirror 1 during assembly. the two piezoelectric elements 11, 12 move the portion 5 and hence the mirror surface 3 to adjust the path length of the lasing cavity. The element 11 is attached to the portion 5 via a block 14, and movement of the mirror surface 3 is achieved by energisation of the elements 11, 12 to alter the position of the surface 3.

Once the transducer assembly 9 is sealed in place it obviates the need for the spring which however remains in place during the lifetime of the path length control mirror 1. It is best to glue the spring 6 in place before attaching the assembly 9 to prevent the spring coming loose during use of the mirror.

The loading needed to be applied to the portion 5 varies according to the mirror used, and the lasing arrangement. For the triaxial ring laser gyroscope the loading applied may be 70 gms on one, two or three of the path length control mirrors of the arrangement to achieve the correct discharge in all three axes.

Figure 5:
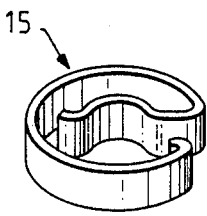
FIGS. 5 and 6 are alternative cavity alignment springs for different loading requirements.
Figure 6:
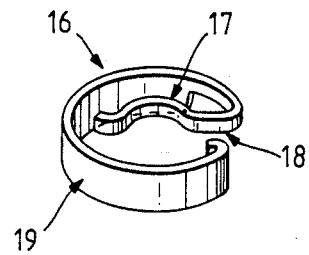

FIGS. 5 and 6 illustrate other versions of the spring described above which may be utilised for the same purpose.

These springs 15 (FIG. 5) and 16 (FIG. 6) are both generally flat in cross section and are generally the same shape in plan view as the wire spring of FIG. 2. The spring 16 has a semicircular part 17 and a bridging part 18, which joins the semicircular part 17 to a main body part 19, which are of reduced width. The spring may be made from a rigid plastics material and may be configured so that the spring will remain within the mirror without the need for glue.

The use of the spring allows the possibility of assembling a lasing cavity arrangement at the first attempt, thereby saving time and the cost of many rebuilds often necessary with a triaxial ring laser gyroscope to ensure the desired lasing performance. Its use also reduces the risk of damage to sealing faces and mirror surface as well as contamination of the lasing cavity during such rebuilds.

I claim:

1. A method of modifying the angular orientation of the reflecting surface of a mirror in a laser cavity comprising:
    deforming the rear surface of the mirror so as to tilt the reflecting surface to optically align the cavity, attaching means to the mirror to maintain the reflecting surface in the desired angular orientation,
    attaching spring means to a projection on the rear surface of the mirror, the spring means being adapted to apply a predetermined deflection to said projection.

2. A method according to claim 1 wherein the spring means comprises a semi-circular part configured to abut the projection and which lies within a generally circular part.

3. A method according to claim 1 comprising glueing the spring means in position on the mirror.

4. A method according to claim 1 comprising attaching a transducer assembly to the rear of the mirror for effecting optical path length control of the laser cavity.

5. An optical cavity assembly for laser apparatus comprising:
    at least two mirrors, and
    spring means attached behind at least one of the mirrors for tilting the reflective surface of said mirror, said at least one mirror comprising a rearward projection,
    the spring means being adapted to apply a predetermined deflection to said projection and comprising a semi-circular part which is configured to abut the projection, and which lies within a generally circular part.

6. An assembly according to claim 5 wherein the spring means is attached to a mirror which is movable so as to effect optical path length control of the laser cavity.

7. An optical cavity assembly for laser apparatus, the assembly including a reflecting surface provided on one face of a substrate, in the opposite face of which there is an annular recess extending around a central columnar portion of the substrate and being extended around by a peripheral wall portion of the substrate, the base of said recess being spaced from said one face by a relatively small thickness of the substrate material to permit axial movement of said columnar portion relative to said wall portion and consequent movement of said reflecting surface, the assembly further including spring means mounted in said recess and operable to apply a force to one side of the columnar portion to modify the angular orientation of said reflecting surface.

* * * * *